United States Patent
Lee et al.

(10) Patent No.: US 11,663,479 B2
(45) Date of Patent: May 30, 2023

(54) APPARATUS AND METHOD OF CONSTRUCTING NEURAL NETWORK TRANSLATION MODEL

(71) Applicant: Electronics and Telecommunications Research Institute, Daejeon (KR)

(72) Inventors: Yo Han Lee, Siheung-si (KR); Young Kil Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1508 days.

(21) Appl. No.: 15/896,409

(22) Filed: Feb. 14, 2018

(65) Prior Publication Data

US 2019/0114545 A1    Apr. 18, 2019

(30) Foreign Application Priority Data

Oct. 13, 2017  (KR) .......................... 10-2017-0133466

(51) Int. Cl.
| | | |
|---|---|---|
| *H04N 19/187* | (2014.01) | |
| *H04N 19/33* | (2014.01) | |
| *G06N 3/082* | (2023.01) | |
| *G06N 3/08* | (2023.01) | |
| *G06F 40/10* | (2020.01) | |

(Continued)

(52) U.S. Cl.
CPC ............. *G06N 3/082* (2013.01); *G06F 40/10* (2020.01); *G06F 40/40* (2020.01); *G06F 40/44* (2020.01); *G06N 3/044* (2023.01); *G06N 3/045* (2023.01); *G06N 3/08* (2013.01)

(58) Field of Classification Search
CPC .... G06N 3/082; G06N 3/0454; G06N 3/0445; G06N 3/08; G06F 40/10; G06F 40/40; G06F 40/44

See application file for complete search history.

(56) References Cited

U.S. PATENT DOCUMENTS

| | | | |
|---|---|---|---|
| 10,003,483 B1 * | 6/2018 | Migliori | .............. H04L 27/0012 |
| 10,248,664 B1 * | 4/2019 | Shen | ....................... G06N 3/084 |

(Continued)

FOREIGN PATENT DOCUMENTS

KR    10-2016-0138892    12/2016

OTHER PUBLICATIONS

Cho, Kyunghyun, et al. "Learning phrase representations using RNN encoder-decoder for statistical machine translation." arXiv preprint arXiv:1406.1078 (2014). (Year: 2014).*

(Continued)

*Primary Examiner* — Brandon S Cole
(74) *Attorney, Agent, or Firm* — Kile Park Reed & Houtteman PLLC

(57) ABSTRACT

Provided is a method of constructing a neural network translation model. The method includes generating a first neural network translation model learning a feature of source domain data used in an unspecific field, generating a second neural network translation model learning a feature of target domain data used in a specific field, generating a third neural network translation model learning a common feature of the source domain data and the target domain data; and generating a combiner combining translation results of the first to third neural network translation models.

16 Claims, 5 Drawing Sheets

(51) Int. Cl.
*G06F 40/40* (2020.01)
*G06F 40/44* (2020.01)
*G06N 3/044* (2023.01)
*G06N 3/045* (2023.01)

(56) References Cited

U.S. PATENT DOCUMENTS

| | | | |
|---|---|---|---|
| 2016/0078863 A1 | 3/2016 | Chung et al. | |
| 2016/0350649 A1 | 12/2016 | Zhang et al. | |
| 2017/0206894 A1 | 7/2017 | Kang et al. | |
| 2017/0357896 A1* | 12/2017 | Tsatsin | G06N 3/084 |
| 2019/0149834 A1* | 5/2019 | Zhou | H04N 19/187 |
| | | | 348/473 |

OTHER PUBLICATIONS

Sutskever, Ilya, Oriol Vinyals, and Quoc V. Le. "Sequence to sequence learning with neural networks." Advances in neural information processing systems 27 (2014). (Year: 2014).*

Ye, Borui, et al. "Learning question similarity with recurrent neural networks." 2017 ieee international conference on big knowledge (icbk). IEEE, 2017. (Year: 2017).*

Das, Resul, Ibrahim Turkoglu, and Abdulkadir Sengur. "Effective diagnosis of heart disease through neural networks ensembles." Expert systems with applications 36.4 (2009): 7675-7680. (Year: 2009).*

Ding, Shifei, et al. "Evolutionary artificial neural networks: a review." Artificial Intelligence Review 39.3 (2013): 251-260. (Year: 2013).*

Ganin, Yaroslav, et al. "Domain-adversarial training of neural networks." The journal of machine learning research 17.1 (2016): 2096-2030. (Year: 2016).*

Shi, Yangyang, et al. "Contextual spoken language understanding using recurrent neural networks." 2015 IEEE International Conference on Acoustics, Speech and Signal Processing (ICASSP). IEEE, 2015. (Year: 2015).*

Shai Ben-David et al., "Analysis of Representations for Domain Adaptation"; Advances in Neural Information Processing Systems 19 (NIPS 2006); pp. 137-144; Dec. 2006.

Konstantinos Bousmailis et al., "Domain Separation Networks"; (30th Conference on Neural Information Processing Systems; Advances in Neural Information Processing Systems 29 (NIPS 2016), pp. 343-351; Dec. 2016.

* cited by examiner

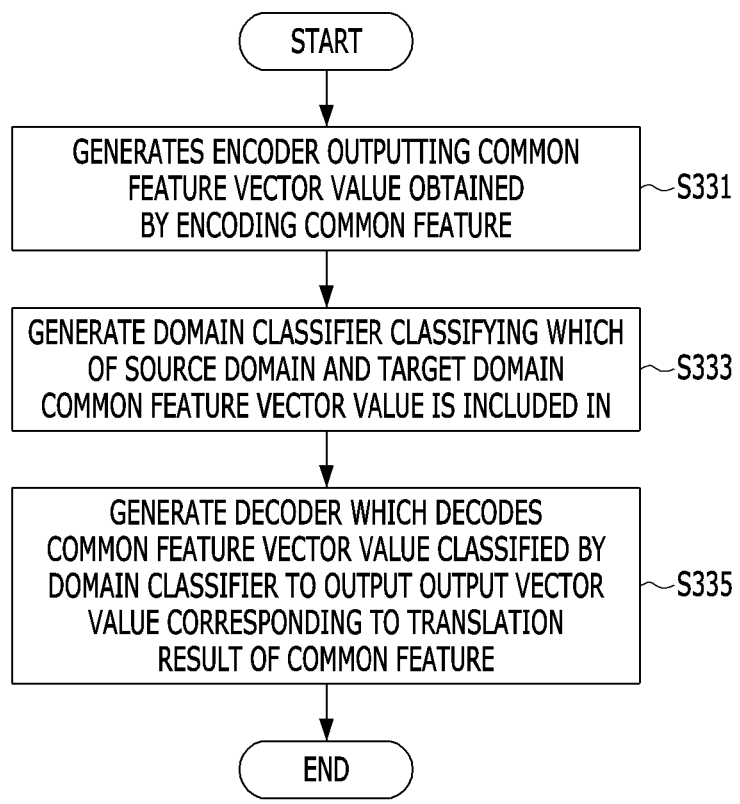

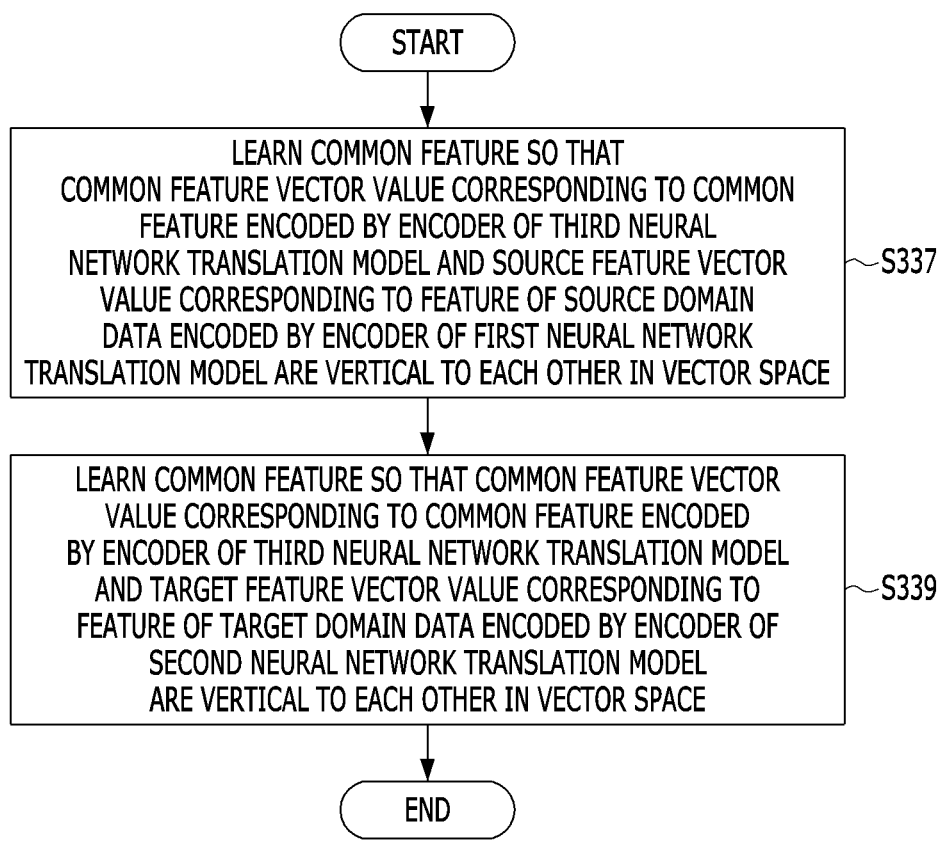

APPARATUS AND METHOD OF CONSTRUCTING NEURAL NETWORK TRANSLATION MODEL

CROSS-REFERENCE TO RELATED APPLICATIONS

This application claims priority under 35 U.S.C. § 119 to Korean Patent Application No. 10-2017-0133466, filed on Oct. 13, 2017, the disclosure of which is incorporated herein by reference in its entirety.

TECHNICAL FIELD

The present invention relates to artificial intelligence (AI) technology, and more particularly, to a neural network model used in the field of translation.

BACKGROUND

A neural network translation model performs learning, based on learning data (or training data). Therefore, the neural network translation model outputs a translation result following a style of learning data. The performance of the neural network translation model may be measured by a method of inputting test data of a specific field to evaluate a translation result corresponding to the test data. Therefore, the performance of the neural network translation model can be considerably changed based on a similarity between the style of the learning data and a style of the test data (or real data).

In order to improve performance, a related art neural network translation model is designed as an ensemble model configured by a combination of a translation model learned based on the learning data and a translation model learned based on the test data. However, although the related art neural network translation model is designed as the ensemble model, the related art neural network translation model still has a limitation in improving translation performance.

Since the test data for measuring performance is data used in the specific field and the learning data is used in field which is broader than the specific field, the amount of the test data is far less than the amount of the learning data. This denotes a reduction in translation performance corresponding to the real data which is used in the same field as the specific field where the test data is used. Also, a neural network translation model constructed in a learning environment where a difference between the amounts of pieces of data by fields is large causes a reduction in translation performance. For this reason, the related art neural network translation model expends much time and cost in a process of adjusting the amounts of pieces of data by fields.

SUMMARY

Accordingly, the present invention provides an apparatus and method of constructing a neural network translation model, which enhance the translation performance of a translation model in a target domain having a relatively small amount of data by using a translation result of a translation model in a source domain without a reduction in translation performance of the translation model in the source domain having a sufficient amount of data.

In one general aspect, a neural network translation model constructing method, performed in a computing device generating a neural network translation model, includes: generating a first neural network translation model which includes a neural network having an encoder-decoder structure and learns a feature of source domain data used in an unspecific field; generating a second neural network translation model which includes a neural network having the encoder-decoder structure and learns a feature of target domain data used in a specific field; generating a third neural network translation model which includes a neural network having the encoder-decoder structure and learns a common feature of the source domain data and the target domain data; and generating a combiner which combines translation results of the first to third neural network translation models.

In another general aspect, a neural network translation model constructing apparatus includes: a processor generating a first neural network translation model which includes a neural network having an encoder-decoder structure and learns a feature of source domain data used in an unspecific field, a second neural network translation model which includes a neural network having the encoder-decoder structure and learns a feature of target domain data used in a specific field, a third neural network translation model which includes a neural network having the encoder-decoder structure and learns a common feature of the source domain data and the target domain data, and a combiner which combines translation results of the first to third neural network translation models; and a storage unit storing the neural network translation model according to a command of the processor.

Other features and aspects will be apparent from the following detailed description, the drawings, and the claims.

BRIEF DESCRIPTION OF THE DRAWINGS

FIG. 4 is a detailed flowchart of step S330 of FIG. 3 according to an embodiment of the present invention.

FIG. 5 is a detailed flowchart of step S330 of FIG. 3 according to another embodiment of the present invention.

DETAILED DESCRIPTION OF EMBODIMENTS

Figure 1:
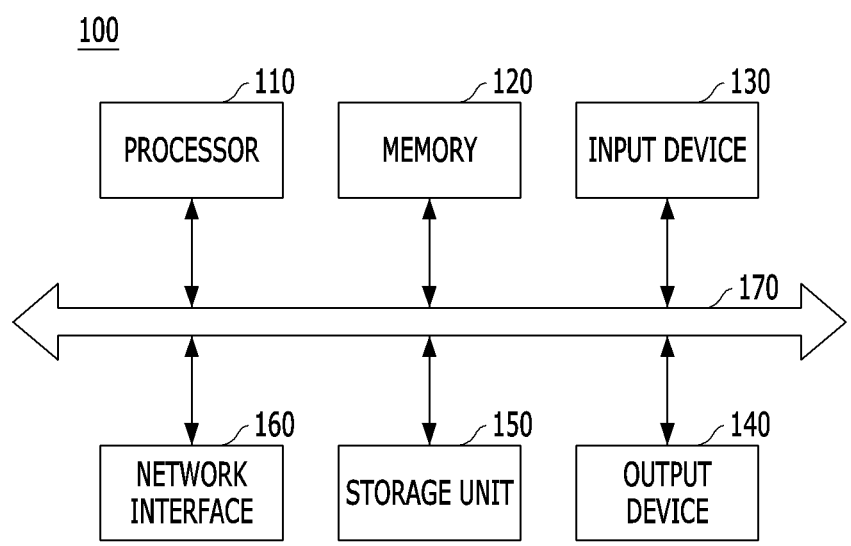
FIG. 1 is a block diagram of a neural network translation model constructing apparatus according to an embodiment of the present invention.

Hereinafter, example embodiments of the present invention will be described in detail with reference to the accompanying drawings. Embodiments of the present invention are provided so that this disclosure will be thorough and complete, and will fully convey the concept of the present invention to one of ordinary skill in the art. Since the present invention may have diverse modified embodiments, preferred embodiments are illustrated in the drawings and are described in the detailed description of the present invention. However, this does not limit the present invention within specific embodiments and it should be understood that the present invention covers all the modifications, equivalents, and replacements within the idea and technical scope of the present invention. Like reference numerals refer to like elements throughout.

First, some terms described herein will be defined as follows.

Source Domain

In the present specification, a source domain may be described as a term indicating one field. The one field may be, for example, one of politics, economics, society, science, education, philosophy, literature, sports, and entertainment.

Moreover, in the present specification, the source domain may be used as a term indicating an unspecific field.

Target Domain

In the present specification, a target domain may indicate a specific field of fields into which the one field defined in the source domain is subdivided. For example, in a case where the source domain indicates a science field, the target domain may be construed as a field indicating one of physics, chemistry, biology, and earth science.

Moreover, in the present specification, the target domain may be used as a term indicating a specific field.

Source Domain Data

In the present specification, source domain data may denote learning data (or training data) which is mainly used (or specialized) in one field defined in the source domain, and for example, in a case where the source domain corresponds to the science field, the source domain data may be referred to as a corpus or a sentence consisting of words or styles mainly used in the science field.

Target Domain Data

In the present specification, target domain data may denote learning data which is mainly used (or specialized) in a specific field of fields into which the one field defined in the source domain is subdivided, and in a case where the source domain corresponds to the science field, the target domain data may be referred to as a corpus or a sentence consisting of words or styles mainly used in physics.

Moreover, the target domain data may be referred to as learning data which is mainly used (or specialized) in a field different from the one field defined in the source domain.

Moreover, the target domain data may be referred to as learning data specialized in a field where a real sentence for checking a translation result is used.

Moreover, the target domain data may be referred to as learning data for testing the performance of a neural network translation model according to an embodiment of the present invention.

Moreover, in a comprehensive meaning, the target domain data may be referred to as learning data having a relatively smaller amount of data than the source domain data.

The neural network translation model provides good translation performance when learning is performed based on learning data having a large amount of good-quality data. In this context, the target domain data may be referred to as learning data of which translation performance is lower than the source domain data.

Moreover, the target domain data may be referred to as learning data having a sentence style different from a sentence style expressed by the source domain data. For example, a sentence style expressed by the source domain data may be a dialogic style, and a sentence style expressed by the target domain data in the same field as a field using the source domain data may be a literary style.

A neural network translation model which has performed learning based on a dialogic-style sentence cannot provide good translation performance in translating a literary-style sentence. Also, a neural network translation model which has performed learning based on a modern sentence cannot provide good translation performance in translating an ancient document.

Artificial Neural Network (Hereinafter Referred to as a Neural Network)

A neural network may be a recognition model implemented as software or hardware which emulates the calculation ability of humans. The neural network may include neuron-type nodes connected to one another. Each of the nodes may be referred to as an artificial neuron. The nodes may be classified into an input layer, an output layer, and a plurality of hidden layers disposed therebetween. Nodes of one layer may be connected to nodes of another layer through a connection line. The connection line may have a connection weight. The connection weight may be a value obtained by digitizing a degree of correlation between nodes connecting two nodes and may be referred to as connection strength.

Learning (or Training)

Learning may be referred to as a process of adjusting (updating) a connection weight associated with a connection between nodes. Adjustment of the connection weight may be included in a learning process of a neural network model.

The learning process may include: repeatedly providing an example of a specific input/output task to a neural network model; comparing an output of the neural network model and a desired output, for measuring an error between the outputs; and adjusting a connection weight, for decreasing the error.

The learning process may be repeated until additional repetition cannot reduce the error (or until the error is reduced to a predetermined minimum value or less). Therefore, the neural network model may be recognized as trained.

In the learning process, the adjusting of the connection weight may denote adjustment of an algorithm mathematically representing an encoder and a decoder described below. The adjustment of the algorithm may be construed as a meaning of adjusting a result value of each of functions constituting the algorithm.

Encoder and Decoder

An encoder may be referred to as a neural network implemented as software or hardware. In a case where the encoder is implemented as software, the encoder may be referred to as a mathematic algorithm consisting of a program code and a set of program codes.

In an embodiment of the present invention, the encoder may encode learning data (or an input sentence) to output a feature vector (or a sentence vector) corresponding to the learning data. The feature vector (or the sentence vector) may be referred to as a value which expresses a distribution of words constituting the learning data (or the input sentence) and semantic information about the words in a vector space. A distribution of words may denote an N-gram distribution. N-gram may denote a distribution structure where words constituting an input sentence are divided into N number of sub strings.

A decoder may be referred to as a neural network implemented as software or hardware. In a case where the decoder is implemented as software, the decoder may be referred to as a mathematic algorithm consisting of a program code and a set of program codes. In an embodiment of the present invention, the decoder may decode a feature vector (or a sentence vector) to output an output vector value corresponding to a translation result. Here, the output vector value may be referred to as a value representing a probability that a result of translation of a specific word is a right answer.

Sequence-to-Sequence Neural Network Model

A neural network translation model constructed according to an embodiment of the present invention may be based on a sequence-to-sequence neural network model, and the sequence-to-sequence neural network model may be used as a term referring to a neural network model including the encoder and the decoder.

The descriptions of the terms are for helping understanding and should not be construed as intention of limiting the technical spirit of the present invention. Also, some terms (for example, the encoder, the decoder, the sequence-to-sequence neural network model, and the connection weight) may be construed identically to known terms frequently described in an artificial neural network field. Unless specially described, known descriptions may be applied to the terms.

FIG. 1 is a block diagram of a neural network translation model constructing apparatus 100 according to an embodiment of the present invention.

Referring to FIG. 1, the neural network translation model constructing apparatus 100 according to an embodiment of the present invention may be implemented with a computing device for constructing a neural network translation model.

The computing device may be, for example, an AI robot, a computer vision device, a voice recognition device, a mobile phone, a wearable device, a home appliance, an in-vehicle electronic device, or the like, but is not limited thereto. In other embodiments, examples of the computing device may include all kinds of electronic devices having a translation function.

The neural network translation model constructing apparatus 100 implemented with the computing device may fundamentally include one or more processors 110, a memory 120, an input device 130, an output device 140, a storage unit 150, a network interface 160, and a bus 170 connecting the elements. Also, the neural network translation model constructing apparatus 100 may further include a network interface connected to a network.

The processor 110 may be a central processing unit (CPU) or a semiconductor device, which executes a processing command stored in the memory 120 and/or the storage unit 150, an operating system (OS) of the neural network translation model constructing apparatus 100, various applications, and a neural network translation model.

The processor 110 may learn a neural network translation model to construct a neural network translation model with improved performance. To this end, the processor 110 may generate program codes and a set of the program codes, which configure the neural network translation model with improved performance. The processor 110 may store the program codes and the set of the program codes in the memory 120 and/or the storage unit 150.

The memory 120 and the storage unit 150 may each include a volatile storage medium or a non-volatile storage medium.

The input device 130 may receive data from a user or an external device. In a case where the data is input from the user, the input device 130 may be a keyboard, a mouse device, or a device having a touch function, or in a case where the data is input from the external device, the input device 130 may be a device having a function of interfacing the external device.

The output device 140 may output a result obtained through processing by the processor 110 and may include an image output unit and a sound output unit. The image output unit may be, for example, a liquid crystal display (LCD) or a light emitting diode (LED) display device, which visually displays a translation result. The sound output unit may be, for example, a speaker which acoustically outputs the translation result.

The neural network translation model constructed by the processor 110 may be based on a sequence-to-sequence neural network model having an encoder-decoder structure. A schematic configuration of a neural network translation model 200 based on the sequence-to-sequence neural network model according to an embodiment of the present invention is illustrated in FIG. 2.

Figure 2:
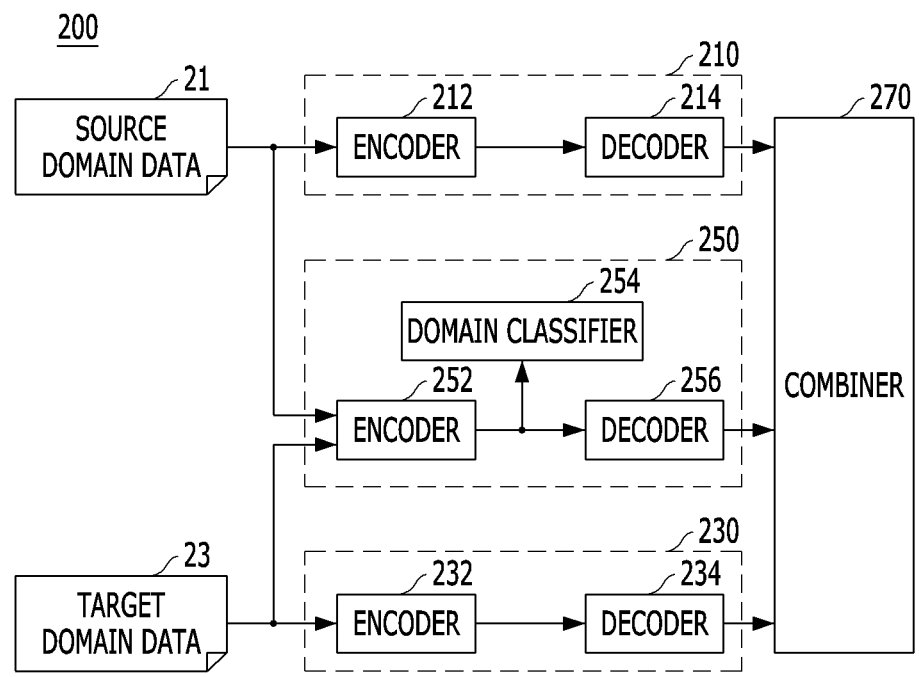
FIG. 2 is a structure diagram of a neural network translation model constructed by the neural network translation model constructing apparatus illustrated in FIG. 1.

Referring to FIG. 2, the neural network translation model 200 according to an embodiment of the present invention may include three neural network translation models 210, 230, and 250 based on the encoder-decoder structure and a combiner 270.

First Neural Network Translation Model 210

The first neural network translation model 210 may learn a feature of source domain data 21. That is, the first neural network translation model 210 may learn only a feature of learning data specialized for the source domain. The first neural network translation model 210 may be implemented with a mathematical algorithm which is generated and executed by the processor (110 of FIG. 1) and includes a set of program codes stored in the storage unit 150. The set of the program codes may be referred to as a function.

The first neural network translation model 210 may include an encoder 212 and a decoder 214.

The encoder 212 may encode a source sentence, expressed by the source domain data 21, as a vector of a k-dimensional space to output a source feature vector value which expresses a feature of the source sentence in a vector space. The encoder 212 may be configured with a recurrent neural network or a convolutional neural network.

The decoder 214 may sequentially decode the source feature vector values from the encoder 212 in the order, in which words constituting the source sentence are sorted, to output a source output vector value corresponding to a translation result of the source sentence. The decoder 214 may be configured with a recurrent neural network or a convolutional neural network.

Second Neural Network Translation Model 230

The second neural network translation model 230 may learn a feature of target domain data 23 having a relatively smaller amount of data than the source domain data 21. That is, the second neural network translation model 230 may learn only a feature of learning data specialized for the target domain. The second neural network translation model 230 may be implemented with a mathematical algorithm which is generated and executed by the processor (110 of FIG. 1) and includes a set of program codes stored in the storage unit 150. The set of the program codes may be referred to as a function.

The second neural network translation model 230 may include an encoder 232 and a decoder 234.

The encoder 232 may encode a target sentence, expressed by the target domain data 23, as a vector of the k-dimensional space to output a target feature vector value which expresses a feature of the target sentence in the vector space. The encoder 232 may be configured with a recurrent neural network or a convolutional neural network.

The decoder 234 may sequentially decode the target feature vector values from the encoder 232 in the order, in which words constituting the target sentence are sorted, to output a target output vector value corresponding to a translation result of the target sentence. The decoder 234 may be configured with a recurrent neural network or a convolutional neural network.

Third Neural Network Translation Model 250

The third neural network translation model 250 may learn a common feature of the source domain data 21 and the target domain data 23. That is, the third neural network translation model 250 may learn only a common feature of features of the learning data specialized for the source domain and features of the learning data specialized for the target domain. Here, the common feature may be defined as a feature where a distribution and meanings of words of a sentence corresponding to the source domain data are similar to a distribution and meanings of words of a sentence corresponding to the target domain data. The third neural network translation model 250 may be implemented with a mathematical algorithm which is generated and executed by the processor (110 of FIG. 1) and includes a set of program codes stored in the storage unit 150. The set of the program codes may be referred to as a function.

The third neural network translation model 250 may include an encoder 252, a domain classifier 254, and a decoder 256.

The encoder 252 may encode a common feature of the source sentence expressed by the source domain data and the target sentence expressed by the target domain data as a vector of the k-dimensional space to output a common feature vector value which expresses a feature of the common sentence in the vector space. The encoder 252 may be configured with a recurrent neural network or a convolutional neural network.

The domain classifier 254 may classify a domain including the common feature. That is, the domain classifier 254 may output a domain classification result value indicating the domain including the common feature. The output domain classification result value may be fed back to the encoder 252. The encoder 252 may determine an end of learning, based on the domain classification result value. As described below, the encoder 252 may repeatedly perform learning on the common feature until the domain classifier 254 cannot accurately classify the domain including the common feature. That is, if the domain classification result value is not a value indicating the target domain and is not a value indicating the source domain, the encoder 252 may determine that learning has been sufficiently performed, and may end the learning.

For example, when it is assumed that a domain classification result value indicating the source domain is 1 and a domain classification result value indicating the target domain is 0, the domain classification result value representing a case where the domain classification result value is not the value indicating the target domain and is not the value indicating the source domain may be 0.5 corresponding to an intermediate value between 0 and 1. Here, 0.5 may be an ideal value. A domain classification result value for actually determining an end of learning of the encoder 252 may be set to an approximate value approximate to an intermediate value of the domain classification result value indicating the source domain and the domain classification result value indicating the target domain within a predetermined allowable error range.

As a result, in an embodiment of the present invention, the learning of the encoder 252 may be a learning process of making the feature of the source domain data 21 and the feature of the target domain data 23 similar, so that the domain classifier 254 cannot classify a domain having the common feature. Accordingly, the domain classifier 254 may be executed only in a learning process of the encoder 252, and may not be executed in a real translation process.

The domain classifier 254 may be configured with one or more hidden layers in a hierarchical structure of a neural network. The domain classifier 254 configured with the hidden layers may be implemented with a mathematical algorithm which is generated and executed by the processor (110 of FIG. 1) and includes a set of program codes stored in the storage unit 150.

The decoder 256 may sequentially decode the common feature vector values in the order, in which words constituting the common feature are sorted, to output a common feature-based output vector value corresponding to a translation result of the common feature. The decoder 256 may be configured with a recurrent neural network or a convolutional neural network.

Combiner 270

The combiner 270 may combine translation results of the first to third neural network translation models 210, 230, and 250 to output a final translation result. That is, the combiner 270 may combine the source output vector value from the decoder 214, the target output vector value from the decoder 234, and the common output vector value from the decoder 256 to output a final output vector value corresponding to the final translation result.

A method of combining, by the combiner 270, the output vector values from the decoders may use, for example, an average calculation method. That is, the final output vector value may be an average value of the source output vector value, the target output vector value, and the common output vector value.

Based on a combination calculation of the combiner 270, the neural network translation model 200 according to an embodiment of the present invention may be referred to as an ensemble model which combines translation results of neural network translation models classified based on domains.

The combiner 270 may be implemented with a mathematical algorithm which is generated and executed by the processor (110 of FIG. 1) and includes a set of program codes stored in the storage unit 150. The set of the program codes may be sometimes referred to as a function.

Learning of Neural Network Translation Model

The neural network translation model 200 according to an embodiment of the present invention may perform learning so that in each of the encoders 212, 232, and 253, a result value of a loss function is minimized. The loss function may be an equation representing the classification performance of the domain classifier 254. The loss function "Loss" may be expressed as the following Equation (1):

$$\text{Loss}=d \log G_d(G_f(x))+(1-d)\log(1-G_d(G_f(x))) \quad (1)$$

where x denotes data, $G_d$ denotes a function representing the domain classifier 254, and $G_f$ denotes a function representing the encoder 252 which encodes a common feature of the source domain data 21 and the target domain data 23. Also, d denotes a value obtained by indexing a domain including data "x".

In Equation (1), when d=1, a right term "$(1-d)\log(1-G_d(G_f(x)))$" of a right side may be removed, and only a left term "$d \log G_d(G_f(x))$" may remain. In the remaining left term "$d \log G_d(G_f(x))$", $G_d(G_f(x))$ belonging to log may be a result value (i.e., a value indicating one of the source domain and the target domain) obtained by the domain classifier 254 classifying data "x", and when it is assumed that a domain classification result value classified as the target domain is 0 and a domain classification result value classified as the source domain is 1, $G_d(G_f(x))$ belonging to log may have a value between 0 and 1.

When the domain classifier 254 calculates a right answer "d", a value of log may become 1, and thus, a result value of the loss function may be the maximum. On the other hand, when the domain classifier 254 does not calculate the right answer "d", the value of log may become 0, and thus, the result value of the loss function may be the minimum.

When d=0, the same result may be obtained.

As a result, in order to minimize the result value of the loss function, the encoder 252 may repeatedly learn a common feature so that the domain classifier 254 does not accurately classify a domain of data. Such a process may be achieved by adjusting a weight of the encoder 252.

Learning of a neural network translation model 200 according to another embodiment of the present invention is to define a loss function so that an output vector value of the encoder 212 specialized for the source domain data 21 and an output vector value of the encoder 232 specialized for the target domain data 23 are vertical to an output vector value of the encoder 252 specialized for a common feature of the source domain data 21 and the target domain data 23.

In the present embodiment, the encoder 252 should learn the common feature of the source domain data 21 and the target domain data 23, and the encoders 212 and 232 should respectively learn a feature specialized for the source domain data and a feature specialized for the target domain data.

In order for a learning strategy to be completely performed, a common feature vector value output from the encoder 252 and a source feature vector value output from the encoder 212 should have a lowest similarity therebetween, and moreover, the common feature vector value output from the encoder 252 and a target feature vector value output from the encoder 232 should have a lowest similarity therebetween.

A case where a similarity between two vector values is the lowest may be a case where the two vector values have a vertical relationship in a vector space.

Therefore, the encoder 252 may learn the common feature of the source domain data 21 and the target domain data 23 so as to output a feature vector vertical to feature vector values output from the encoders 212 and 232 specialized for the respective domains.

Such a learning process may be represented as the loss function of the domain classifier 254 expressed as the following Equation (2):

$$\text{Loss} = \|H_v^{S'} H_s^S\| + \|H_v^{T'} H_s^T\| \quad (2)$$

where H denotes a feature vector of an encoder for data, S denotes a source domain, and T denotes a target domain. Also, v denotes an encoder specialized for a domain, and s denotes the encoder 252 which encodes the common feature of the source domain data and the target domain data. That is, a left term of a right side denotes that a feature vector output from the encoder 212 specialized for the source domain and a feature vector output from the encoder 252 specialized for the common feature have a vertical relationship therebetween, and a right term of the right side denotes that a feature vector output from the encoder 232 specialized for the target domain and a feature vector output from the encoder 252 specialized for the common feature have a vertical relationship therebetween.

As described above, in a learning process, the encoders 212 and 232 specialized for the respective domains and the encoder 252 specialized for the common feature may perform learning so as to minimize the loss function of the domain classifier 254, and by learning encoders by domains by using a new loss function which is defined in order for feature vectors by domains to have a vertical relationship therebetween, a real environment which cannot ensure the translation performance of the target domain because the amount of target domain data is small may be reflected, and the translation performance of each of the source domain and the target domain can be ensured without a data adjusting process which expends much time and cost.

Figure 3:
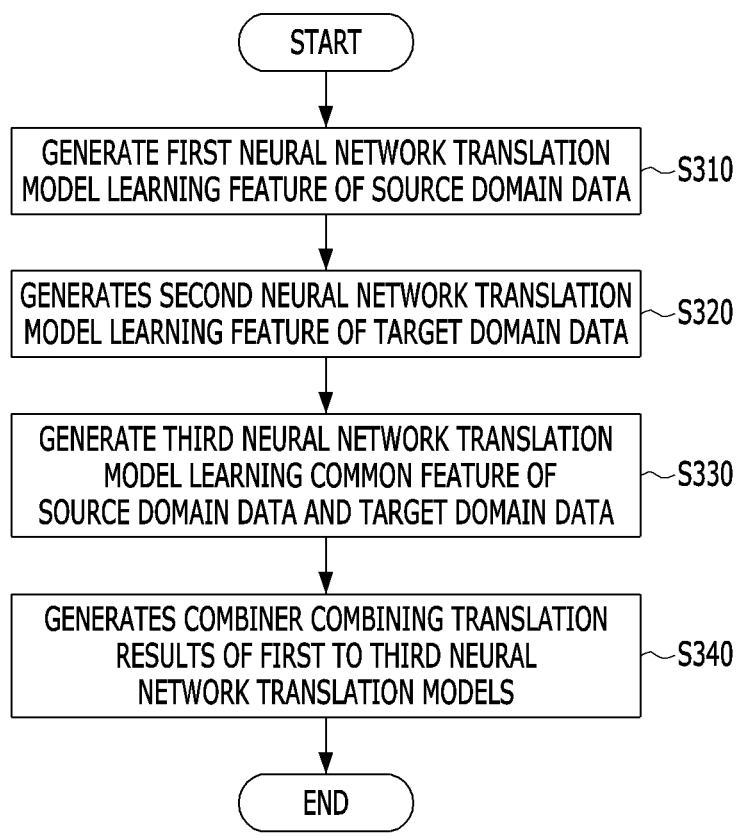
FIG. 3 is a flowchart of a neural network translation model constructing method according to an embodiment of the present invention.

FIG. 3 is a flowchart of a neural network translation model constructing method according to an embodiment of the present invention. To help understand description, FIGS. 1 and 2 may be referred to. Also, details overlapping details described above with reference to FIGS. 1 and 2 will be briefly described or are omitted. Also, unless specially described, the following steps may be performed by the processor 110 illustrated in FIG. 1.

Referring to FIG. 3, first, in step S310, a process of generating a first neural network translation model 210 which includes a neural network having an encoder-decoder structure and learns a feature of source domain data 21 used in an unspecific field may be performed.

Subsequently, in step S320, a process of generating a second neural network translation model 230 which includes a neural network having the encoder-decoder structure and learns a feature of target domain data 23 used in a specific field may be performed. Here, step S320 may be performed prior to step S310, or may be performed in parallel with step S310.

Subsequently, in step S330, a process of generating a third neural network translation model 250 which includes a neural network having the encoder-decoder structure and learns a common feature of the source domain data 21 and the target domain data 23 may be performed. Here, the common feature may denote a feature where a word distribution (or an N-gram distribution) and meaning of a sentence expressed by the source domain data 21 are similar to a word distribution (or an N-gram distribution) and meaning of a sentence expressed by the target domain data 23.

Subsequently, in step S340, a process of generating a combiner 270 which combines translation results of the first to third neural network translation models 210, 230, and 250 may be performed. Based on a combination operation of the combiner 270, the neural network translation model according to an embodiment of the present invention may function as an ensemble model obtained by a combination of the translation results of the first to third neural network translation models 210, 230, and 250.

FIG. 4 is a detailed flowchart of step S330 of FIG. 3 according to an embodiment of the present invention.

Referring to FIG. 4, first, in step S331, a process of generating an encoder 252 which outputs a common feature vector value obtained by encoding the common feature of the source domain data and the target domain data as a vector of the k-dimensional space may be performed.

Subsequently, in step S333, a process of generating a domain classifier 254 classifying which of the source domain and the target domain the common feature vector value is included in may be performed. In this case, the encoder 252 may encode the common feature so that the domain classifier 254 cannot accurately classify which of the source domain and the target domain the common feature vector value is included in. Learning of the encoder 252 may be repeatedly performed until the domain classifier 254 outputs a value indicating that the domain classifier 254 does not accurately classify which of the source domain and the target domain the common feature vector value is included in. The learning of the encoder 252 may be achieved by adjusting a connection weight connecting nodes of a neural network configuring the encoder 252. As described above, since the encoder 252 performs learning so as to obstruct a classification operation of the domain classifier 254, a result value of the loss function is minimized.

Subsequently, in step S335, a process of generating a decoder which decodes the common feature vector value to output an output vector value corresponding to a translation result of the common feature may be performed.

FIG. 5 is a detailed flowchart of step S330 of FIG. 3 according to another embodiment of the present invention.

Referring to FIG. 5, first, in step S337, a process of learning the common feature so that a common feature vector value corresponding to the common feature encoded by the encoder 252 of the third neural network translation model 250 and a source feature vector value corresponding to a feature of the source domain data 21 encoded by the encoder 212 of the first neural network translation model 210 are vertical to each other in the vector space may be performed.

Subsequently, in step S339, a process of learning the common feature so that the common feature vector value corresponding to the common feature encoded by the encoder 252 of the third neural network translation model 250 and a target feature vector value corresponding to a feature of the target domain data 23 encoded by the encoder 232 of the second neural network translation model 230 are vertical to each other in the vector space may be performed.

In the present embodiment, the above-described loss function (Equation (2)) expressing the learning processes (S337 and S339) may be newly defined, and by the encoder 252 performing learning so as to minimize the newly defined loss function, the translation performance of the translation model 230 in the target domain having a relatively small amount of data is enhanced by using the translation result of the translation model 210 in the source domain, without a reduction in translation performance of the translation model 210 in the source domain.

As described above, according to the embodiments of the present invention, since an ensemble model is constructed by combining a plurality of neural network translation models specialized by domains and a neural network translation model which learns similar features of pieces of learning data by domains, the translation performance of a translation model in a target domain having a relatively small amount of data is enhanced by using a translation result of a translation model in a source domain without a reduction in translation performance of the translation model in the source domain having a sufficient amount of data. Also, much time and cost expended in a process of adjusting the amount of learning data in the source domain and the amount of learning data in the target domain can be reduced.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A neural network translation model constructing method performed in a computing device generating a neural network translation model, the neural network translation model constructing method comprising:

generating a first neural network translation model which includes a neural network having an encoder-decoder structure and learns a feature of source domain data used in an unspecific field;

generating a second neural network translation model which includes a neural network having the encoder-decoder structure and learns a feature of target domain data used in a specific field;

generating a third neural network translation model which includes a neural network having the encoder-decoder structure and learns a common feature of the source domain data and the target domain data; and generating a combiner which combines translation results of the first to third neural network translation models, wherein the source domain data is learning data which is used in one field defined in the unspecific field and the target domain data is learning data which is used in the specific field of the one field, wherein the generating of the third neural network translation model comprises:

generating an encoder outputting a common feature vector value obtained by encoding the common feature;

generating a domain classifier that feeds back a domain classification result value indicating whether the common feature vector value is included in the source domain or the target domain to the encoder; and generating a decoder which decodes the common feature vector value classified by the domain classification result value to output an output vector value corresponding to a translation result of the common feature, wherein the encoder ends learning based on the domain classification result value indicating that the common feature vector value cannot be classified as the source domain or the target domain.

2. The neural network translation model constructing method of claim 1, wherein based on the combination operation of the combiner, the neural network translation model functions as an ensemble model obtained by the combination of the translation results of the first to third neural network translation models.

3. The neural network translation model constructing method of claim 1, wherein in the generating of the third neural network translation model, the common feature is a feature where a word distribution and meaning of a sentence expressed by the source domain data are similar to a word distribution and meaning of a sentence expressed by the target domain data.

4. The neural network translation model constructing method of claim 1, wherein the encoding of the common feature comprises adjusting a connection weight connecting nodes of a neural network configuring the encoder so that the domain classifier does not accurately classify which of the source domain and the target domain the common feature vector value is included in.

5. The neural network translation model constructing method of claim 1, wherein the generating of the third neural network translation model comprises:

learning the common feature so that a common feature vector value corresponding to the common feature encoded by the encoder of the third neural network translation model and a source feature vector value corresponding to a feature of the source domain data encoded by the encoder of the first neural network translation model are vertical to each other in a vector space; and learning the common feature so that the common feature vector value corresponding to the common feature encoded by the encoder of the third neural network translation model and a target feature vector value corresponding to a feature of the target domain data encoded by the encoder of the second neural network translation model are vertical to each other in the vector space.

6. A neural network translation model constructing apparatus comprising:
a processor generating a first neural network translation model which includes a neural network having an encoder-decoder structure and learns a feature of source domain data used in an unspecific field, a second neural network translation model which includes a neural network having the encoder-decoder structure and learns a feature of target domain data used in a specific field, a third neural network translation model which includes a neural network having the encoder-decoder structure and learns a common feature of the source domain data and the target domain data, and a combiner which combines translation results of the first to third neural network translation models; and
a storage unit storing the neural network translation model according to a command of the processor,
wherein the source domain data is learning data which is used in one field defined in the unspecific field and the target domain data is learning data which is used in the specific field of the one field,
wherein the third neural network translation model comprises:
an encoder outputting a common feature vector value obtained by encoding the common feature;
a domain classifier feeding back a domain classification result value indicating whether the common feature vector value is included the source domain or the target domain to the encoder;
a decoder decoding the common feature vector value classified by the domain classifier to output an output vector value corresponding to a translation result of the common feature,
wherein the encoder ends learning based on the domain classification result value indicating that the common feature vector value cannot be classified as the source domain or the target domain.

7. The neural network translation model constructing apparatus of claim 6, wherein the common feature is a feature where a word distribution and meaning of a sentence expressed by the source domain data are similar to a word distribution and meaning of a sentence expressed by the target domain data.

8. The neural network translation model constructing apparatus of claim 6, wherein the processor performs a process of adjusting a connection weight connecting nodes of a neural network configuring the encoder so that the domain classifier does not accurately classify which of the source domain and the target domain the common feature vector value is included in.

9. The neural network translation model constructing apparatus of claim 6, wherein the processor executes the domain classifier in a learning process of the neural network translation model, and does not execute the domain classifier in an actual translation process performed by the neural network translation model.

10. The neural network translation model constructing apparatus of claim 6, wherein the domain classifier is implemented with a plurality of hidden layers in a hierarchical structure of a neural network, based on a process of the processor.

11. The neural network translation model constructing apparatus of claim 6, wherein
based on a process of the processor,
the third neural network translation model learns the common feature so that a common feature vector value corresponding to the common feature encoded by the encoder of the third neural network translation model and a source feature vector value corresponding to a feature of the source domain data encoded by the encoder of the first neural network translation model are vertical to each other in a vector space, and
the third neural network translation model learns the common feature so that the common feature vector value corresponding to the common feature encoded by the encoder of the third neural network translation model and a target feature vector value corresponding to a feature of the target domain data encoded by the encoder of the second neural network translation model are vertical to each other in the vector space.

12. The neural network translation model constructing apparatus of claim 6, wherein based on the combination operation of the combiner, the neural network translation model functions as an ensemble model obtained by the combination of the translation results of the first to third neural network translation models.

13. The neural network translation model constructing apparatus of claim 6, wherein the first neural network translation model comprises:
based on a process of the processor,
an encoder outputting a source feature vector value obtained by encoding a feature of the source domain data; and
a decoder decoding the source feature vector value to output a source output vector value corresponding to a translation result of the source domain data.

14. The neural network translation model constructing apparatus of claim 13, wherein the encoder of the first neural network translation model encodes the feature of the source domain data to be vertical to a common feature vector value obtained by the encoder of the third neural network translation model encoding the common feature, in a vector space.

15. The neural network translation model constructing apparatus of claim 6, wherein the second neural network translation model comprises:
based on a process of the processor,
an encoder outputting a target feature vector value obtained by encoding a feature of the target domain data; and
a decoder decoding the target feature vector value to output a target output vector value corresponding to a translation result of the target domain data.

16. The neural network translation model constructing apparatus of claim 15, wherein the encoder of the second neural network translation model encodes the feature of the target domain data to be vertical to a common feature vector value obtained by the encoder of the third neural network translation model encoding the common feature, in a vector space.

\* \* \* \* \*